United States Patent
Matthews

[15] 3,667,586
[45] June 6, 1972

[54] ENDLESS BELT CONVEYORS

[72] Inventor: Edmund William Matthews, Hallow, England

[73] Assignee: Dowty Meco Limited, Worcester, England

[22] Filed: Nov. 2, 1970

[21] Appl. No.: 85,980

[30] Foreign Application Priority Data

Nov. 15, 1968 Great Britain......................56,023/68
Nov. 15, 1968 Great Britain......................56,024/68

[52] U.S. Cl..................................................198/1, 198/139
[51] Int. Cl..............................................B65g, B65g 15/00
[58] Field of Search................198/1, 129, 139; 242/54, 86.5

[56] References Cited

UNITED STATES PATENTS 2,933,177  4/1960  Long......................................198/139
2,958,410  11/1960  Poundstone................................198/1

*Primary Examiner*—Richard E. Aegerter
*Attorney*—Young & Thompson

[57] ABSTRACT

An endless belt conveyor having means for mounting a reel for belting, whereby belting may be readily added to or removed from the endless belt when the overall length of the conveyor has to be increased or decreased.

6 Claims, 3 Drawing Figures

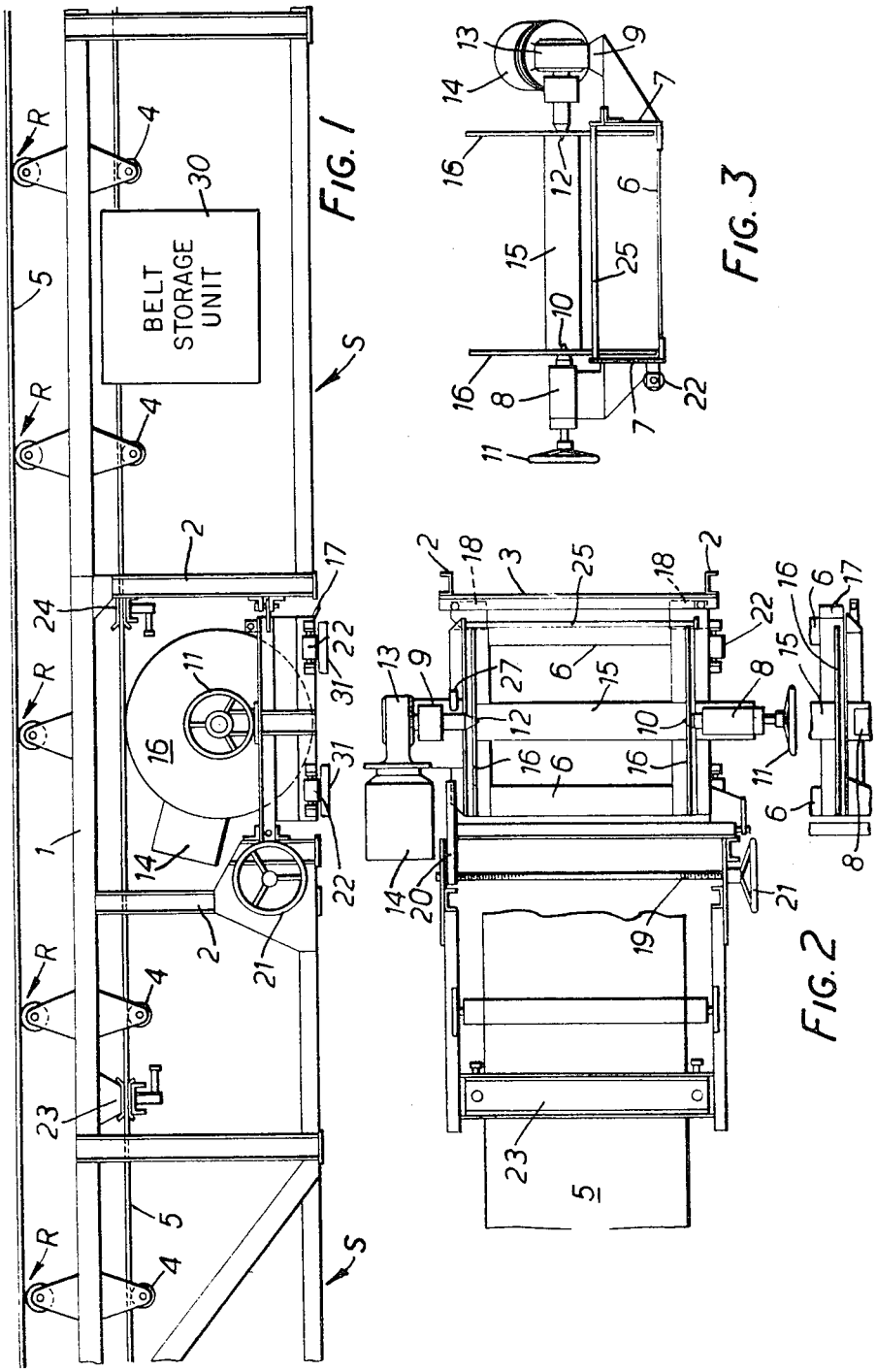

ENDLESS BELT CONVEYORS

This invention relates to endless belt conveyors. During use of an endless belt conveyor, it sometimes becomes necessary to add a new piece of belt to or to take away a piece of belt from the endless belt. When the conveyor is permanent the adding or taking away of belt is necessary when part of the belt becomes worn. When the conveyor is adjustable in length it is sometimes necessary to add or take away belt during length adjustment of the conveyor. Conveyor belt is usually stored on reels and when belt is being added to or taken away from a conveyor it is conventional for the reel and the belt to be manually manipulated at the side of or at the end of the conveyor. Such manual manipulation may be strenuous when the conveyor is a coal carrying conveyor since a reel of belt may weigh several hundredweights and the belt itself may be difficult to bend manually.

In accordance with the present invention an endless belt conveyor comprises a conveyor structure, an endless belt, rollers carried by the structure at spaced intervals therealong for supporting the endless belt, and means for mounting a reel for belting, said means for mounting being movable from a reel-loading position where a reel mounted thereby is outside the conveyor structure to a belt-dispensing and -collecting position where the reel is within the structure and its rotational axis is at right angles to the length of run of the endless belt. Thus belting may run off or onto the reel so as to be added to or removed from the endless belt without substantial bending other than across the thickness of the belt.

The mounting means may be movable transversely of the length of the conveyor in between the said belt-dispensing and -collecting position and a reel loading position in which the reel may be loaded on to or unloaded from the mounting.

The belt-dispensing and -collecting position of the mounting may be close to a part of the endless conveyor belt returning at low tension from the conveyor driving drum. The mounting may include means for lifting the reel for free rotation.

The mounting may also include clamps for gripping the endless conveyor belt at two close positions whereby the conveyor belt may be broken in between the clamped positions, one end of the belt secured to the belt end of the reel, one clamp released to allow the conveyor to take up the belt from the reel, the said clamp being clamped on to the belt from the reel whereby the other end of the belt from the reel may be secured to the clamped end of the conveyor belt.

One embodiment of the invention will now be described with reference to the accompanying drawings, in which FIG. 1 is an elevation of sections of an endless belt conveyor which includes the belt-dispensing and -collecting position (hereinafter called the winding position) and has a reel for belting located therein, FIG. 2 is a plan view of the conveyor section of FIG. 1 at the winding position, and FIG. 3 is an elevation of the reel mounting means used in FIGS. 1 and 2.

The conveyor incorporating orthodox stringers and stools and the section shown in FIGS. 1 and 2, is an endless belt conveyor for use in a coal mine and is extendible in length as the excavation of coal proceeds in the mine. To accommodate normal variation in length of the endless belt a well-known belt storage section 30 is provided on the conveyor which comprises a slidable carriage carrying a plurality of belt rollers which moves relative to a fixed set of belt rollers, the belt being passed in between the fixed and the moving rollers so that movement of the carriage causes effective lengthening or shortening of the belt to an extent many times greater than the movement of the carriage. With continued use and extension of the length of the conveyor the time ultimately arrives when the belt storage section can no longer provide further belt and it is necessary to insert a further length of belt into the endless belt of the conveyor.

The conveyor itself is composed of many sections S detachably secured together each of which carries troughed idler rollers R to support the upper run of the belt 5 whilst carrying coal and flat rollers 4 to carry the belt 5 on its unloaded return run. One such section may be conveniently arranged to form the winding position and this section is appropriately shown in FIGS. 1 and 2. The section is formed of a framework of steel girder members formed principally of longitudinal members 1, upright members 2 and transverse members 3. The upper longitudinal members carry a single flat roller 4 which helps to support the return run of belt 5. The winding position is conveniently formed between two pairs of upright members 2 and at least one of the transverse members 3 is adapted to form a support for the reel mounting means shown in FIG. 3.

The reel mounting means comprises a simple framework having a pair of flat base members 6, a pair of end members 7 secured to the base member 6 and a pair of reel supports or arms 8 and 9 secured respectively to the end members 7. The support member 8 includes a conical center 10 supported by a screw thread in the member 8 and capable of axial movement in the member 8 by rotation of a hand wheel 11. The support member 9 includes a conical center 12 supported on a gear box 13 and rotatably driven by an electric motor 14.

A typical belt reel comprises a hollow cylinder 15 having a pair of discs 16 secured one to either end thereof, the discs each including a central hole for engagement by the centers 10 and 12. A reel may be manually rolled on to the mounting over one of the base members 6 which includes a suitably inclined ramp 17. When the reel is in position on the mounting the hand wheel 11 is operated to urge the center 10 into one end hole of the reel to engage and urge the reel against the other conical center 12 whereby the two centers engage the reel and lift it slightly from the base such that the reel is capable of rotation.

The reel mounting as shown in FIG. 3 is slidably mounted in the winding position so that it can either take up a position completely within the conveyor section of FIG. 1 or alternatively fully withdrawn, the scrap view of FIG. 2 showing it partly withdrawn, for the reel to be loaded in position. For sliding the mounting into and out of the winding position four projections 18 are provided two on either side of the reel mounting to slidably engage structural members 3. To facilitate sliding movement of the reel mounting a long screw 19 manually rotatable by wheel 21 is carried transversely of the conveyor section, a screw threaded driving member 20 carried by the screw engaging the reel mounting so that the latter may be easily moved into or out of its winding position. Rollers 22 carried on the base of the reel mounting at its outer end engage suitable runners shown at 31 in FIG. 1 on the floor where the conveyor is located so that the wheel mounting may move transversely without substantial friction.

The conveyor section of FIG. 1 includes a pair of belt clamps 23 and 24 located at spaced positions.

When a new reel of belt is required for insertion into the conveyor endless belt a reel of belt is rolled up to the reel mounting and entered on to the reel mounting when in its extended position from the conveyor section. A retaining bar 25 may be inserted in suitable slots formed in the end member 7 to retain the reel loosely in position. The handle 11 is operated to cause the conical centers 10 and 12 to enter the reel winding holes and to lift the reel slightly off the base. The handle 21 is then operated to wind the reel mounting into the conveyor. The endless belt of the conveyor is usually formed of a number of sections secured together by connectors in end to end relation. In order to insert the belt section from the reel the conveyor is stopped and the two clamps 23 and 24 are applied to the return run 5 of the belt, a belt connection being located between the two clamps. The belt connection is then broken and the outer end of the reel is attached at one end of the return run 5. The clamp 23 is then released and the belt is drawn from the reel into the conveyor, the reel freely rotating on the conical centers 10 and 12. When the belt is almost completely removed from the reel the free end thereof is connected to the end of the return run of the belt still held by clamp 24. The clamp 24 is then released and the conveyor is again suitable for operation.

On occasions it is necessary to remove a length of belt from the endless belt and the reverse of the above procedure is then adopted with the exception that it would be necessary to drive the reel by means of the motor 14 in order to roll the unwanted length of belt on to the reel. For this purpose the center 12 carries a key 27 capable of engaging in a suitable slot in the reel to transmit drive thereto.

During the winding of belt on to or off the reel it will be appreciated from the position of the reel that the belt need only bend across its thickness. This results from the fact that planes through the two end discs 16 of the reel if extended would pass one on either side of the return run 5 of the endless belt and the width of the belt on the reel is parallel to the width of the return run 5 of the endless belt. There are other possible arrangements of the reel relative to the return run of the belt from which belt may be arranged to run into the normal path of the endless belt with substantial bending only within the thickness of the belt. For example, the reel could be arranged so that the reel axis is not parallel to the width of the return run of the belt but at the same time the belt between the normal path of the endless belt and the reel is twisted about its length such that the edges of the belt do not tend to become different in length from one another.

In an alternative construction to avoid the necessity for manual operation the screw 19 may be driven by an electric motor. The electric motor 14 may be arranged to drive the screw 19 and for this purpose the illustrated structure would need to be modified by mounting the motor 14, gear box 13 and center 12 on the conveyor section rather than on the reel mounting and providing clutches to connect the motor to drive either the reel or the screw 19. This modification also requires that the reel should rest on the base members 6 whilst the mounting is being moved into and out of the conveyor section and that the wheel 11 can be operated to cause the centers 10 and 12 to enter the reel only when the mounting and reel have been fully entered into the winding position in the conveyor section.

I claim:

1. An endless belt conveyor comprising a conveyor structure, an endless belt, upper rollers carried by the structure at spaced intervals therealong for supporting the endless belt in its upper load-carrying run, lower rollers carried by the structure at spaced intervals therealong for supporting the belt in its lower return run, and means for mounting a reel for belting, said means being movable from a reel loading and unloading position where a reel mounted thereby is outside the conveyor structure to a belt dispensing and collecting position where the reel is within the conveyor structure under the upper load-carrying run of the belt where its rotation axis is so located that belt can be dispensed into or collected from the lower return run of the belt.

2. An endless belt conveyor as claimed in claim 1 in which the reel-loading position is alongside the conveyor structure and the means for mounting a reel is movable from its said one position to its said other position transversely to run the length of the endless belt.

3. An endless belt conveyor as claimed in claim 2 in which the means for mounting a reel is slidably movable on the conveyor structure under the lower return run of the belt.

4. An endless belt conveyor according to claim 1, wherein a belt storage unit is provided in the conveyor structure beneath the upper load-carrying run of the belt.

5. An endless belt conveyor according to claim 1, wherein anti-friction roller means are provided on the base of the means for mounting the reel and wherein runners are mounted on the floor on which the conveyor stands, said rollers engaging said runners to facilitate movement of said means for mounting between its two positions.

6. In an endless belt conveyor comprising a conveyor structure, an endless belt having an upper load-carrying run and a lower return run, means carried by the structure for supporting said runs of the belt, and means for mounting a reel for belting, said means for mounting comprising a frame rotatably carrying the reel and movable from a reel loading and unloading station position outside the conveyor structure to a belt dispensing and collecting station position within the conveyor structure, the improvement wherein said belt dispensing and collecting station is beneath the upper run of the belt and wherein means are provided so positioning the frame at said belt dispensing and collecting station that rotation of the reel relative to the frame is effective to dispense belt into or to collect belt from the lower return run of the belt.

* * * * *